(12) United States Patent
Ichikawa

(10) Patent No.: US 8,994,856 B2
(45) Date of Patent: Mar. 31, 2015

(54) IMAGE PROCESSING APPARATUS, IMAGING APPARATUS, AND IMAGE PROCESSING METHOD FOR PROVIDING EDGE ENHANCEMENT

(75) Inventor: Manabu Ichikawa, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 1166 days.

(21) Appl. No.: 12/907,293

(22) Filed: Oct. 19, 2010

(65) Prior Publication Data

US 2011/0090376 A1   Apr. 21, 2011

(30) Foreign Application Priority Data

Oct. 21, 2009   (JP) ................................. 2009-242185

(51) Int. Cl.
| | |
|---|---|
| H04N 5/208 | (2006.01) |
| G06K 9/40 | (2006.01) |
| H04N 5/357 | (2011.01) |
| G06T 5/00 | (2006.01) |
| H04N 5/228 | (2006.01) |

(52) U.S. Cl.
CPC .............. *H04N 5/3572* (2013.01); *G06T 5/003* (2013.01); *G06T 5/006* (2013.01); *G06T 5/002* (2013.01); *G06T 2207/10016* (2013.01); *G06T 2207/20192* (2013.01)
USPC .......................................... 348/252; 382/266

(58) Field of Classification Search
USPC ................. 348/241, 252, 349, 354, 606, 627; 382/254, 263, 266, 275
See application file for complete search history.

(56) References Cited

U.S. PATENT DOCUMENTS

| | | | | |
|---|---|---|---|---|
| 6,829,016 B2 * | 12/2004 | Hung | ............................. | 348/581 |
| 8,120,666 B2 * | 2/2012 | Kasahara | ................... | 348/222.1 |
| 8,417,031 B2 * | 4/2013 | Kasahara | ...................... | 382/167 |
| 2002/0027672 A1 * | 3/2002 | Horie | ........................... | 358/1.12 |
| 2003/0158838 A1 * | 8/2003 | Okusa | .............................. | 707/1 |
| 2007/0115384 A1 * | 5/2007 | Furukawa | .................... | 348/335 |
| 2008/0278602 A1 * | 11/2008 | Otsu | .......................... | 348/223.1 |
| 2009/0135277 A1 * | 5/2009 | Kasahara | ...................... | 348/242 |

(Continued)

FOREIGN PATENT DOCUMENTS

| | | |
|---|---|---|
| JP | 2004-112728 | 4/2004 |
| JP | 2004-242125 | 8/2004 |

(Continued)

OTHER PUBLICATIONS

Notice of Reasons for Rejection for Japanese Patent Application No. 2009-242185, mailed Aug. 6, 2013 (2 pgs.) with English translation (2 pgs.).

*Primary Examiner* — Twyler Haskins
*Assistant Examiner* — Carramah J Quiett
(74) *Attorney, Agent, or Firm* — John C. Pokotylo; Straub & Pokotylo

(57) ABSTRACT

Edge enhancement processing is implemented on an image data, and distortion correction processing is implemented on the image data subjected to the edge enhancement processing to correct a distortion by executing local enlargement processing or reduction processing corresponding to an optical distortion characteristic of a lens employed during an image pickup operation. At this time, the edge enhancement processing performed on the image data to be subjected to the distortion correction processing is modified in accordance with the local enlargement processing or reduction processing.

12 Claims, 15 Drawing Sheets

(56) References Cited

U.S. PATENT DOCUMENTS

2009/0226086 A1* 9/2009 Kasahara .................. 382/167
2011/0254947 A1* 10/2011 Kasahara .................. 348/135

FOREIGN PATENT DOCUMENTS

| | | |
|---|---|---|
| JP | 2005-011269 | 1/2005 |
| JP | 2009-003953 | 1/2009 |

* cited by examiner

IMAGE PROCESSING APPARATUS, IMAGING APPARATUS, AND IMAGE PROCESSING METHOD FOR PROVIDING EDGE ENHANCEMENT

FIELD OF THE INVENTION

This invention relates to a technique for performing distortion correction on image data.

BACKGROUND OF THE INVENTION

In a digital camera, an image that appears highly realistic can be captured by performing image processing such as color reproduction and edge enhancement on RAW data obtained from an image pickup operation. Further, in a known camera, image processing for correcting distortion and chromatic aberration caused by optical characteristics of a lens is performed, and as a result, an image exhibiting little distortion and chromatic aberration can be captured. JP2009-3953A discloses an image processing apparatus that corrects distortion by partially enlarging/reducing image data in accordance with characteristics of a lens.

SUMMARY OF THE INVENTION

An image processing apparatus of an aspect of the present invention comprises an edge enhancement unit that implements edge enhancement processing on an input image data, a distortion correction unit that implements distortion correction processing on the image data subjected to the edge enhancement processing to correct a distortion by executing local enlargement processing or reduction processing corresponding to an optical distortion characteristic of a lens employed during an image pickup operation, and a control unit that modifies the edge enhancement processing performed on the image data to be subjected to the distortion correction processing in accordance with the local enlargement processing or reduction processing.

An image processing apparatus of another aspect of the present invention comprises a distortion correction unit that implements distortion correction processing on an input image data to correct a distortion by executing local enlargement processing or reduction processing corresponding to an optical distortion characteristic of a lens employed during an image pickup operation, an edge enhancement unit that implements edge enhancement processing on the image data subjected to the distortion correction processing, and a control unit that modifies the edge enhancement processing performed on the image data subjected to the distortion correction processing in accordance with the local enlargement processing or reduction processing.

An image processing method of yet another aspect of the present invention comprises a step of implementing edge enhancement processing on an image data, a step of implementing distortion correction processing on the image data subjected to the edge enhancement processing to correct a distortion by executing local enlargement processing or reduction processing corresponding to an optical distortion characteristic of a lens employed during an image pickup operation, and a step of modifying the edge enhancement processing performed on the image data to be subjected to the distortion correction processing in accordance with the local enlargement processing or reduction processing.

An image processing method of yet another aspect of the present invention comprises a step of implementing distortion correction processing on an image data to correct a distortion by executing local enlargement processing or reduction processing corresponding to an optical distortion characteristic of a lens employed during an image pickup operation, a step of implementing edge enhancement processing on the image data subjected to the distortion correction processing, and a step of modifying the edge enhancement processing performed on the image data subjected to the distortion correction processing in accordance with the local enlargement processing or reduction processing.

DESCRIPTION OF THE PREFERRED EMBODIMENTS

First Embodiment

Figure 1:
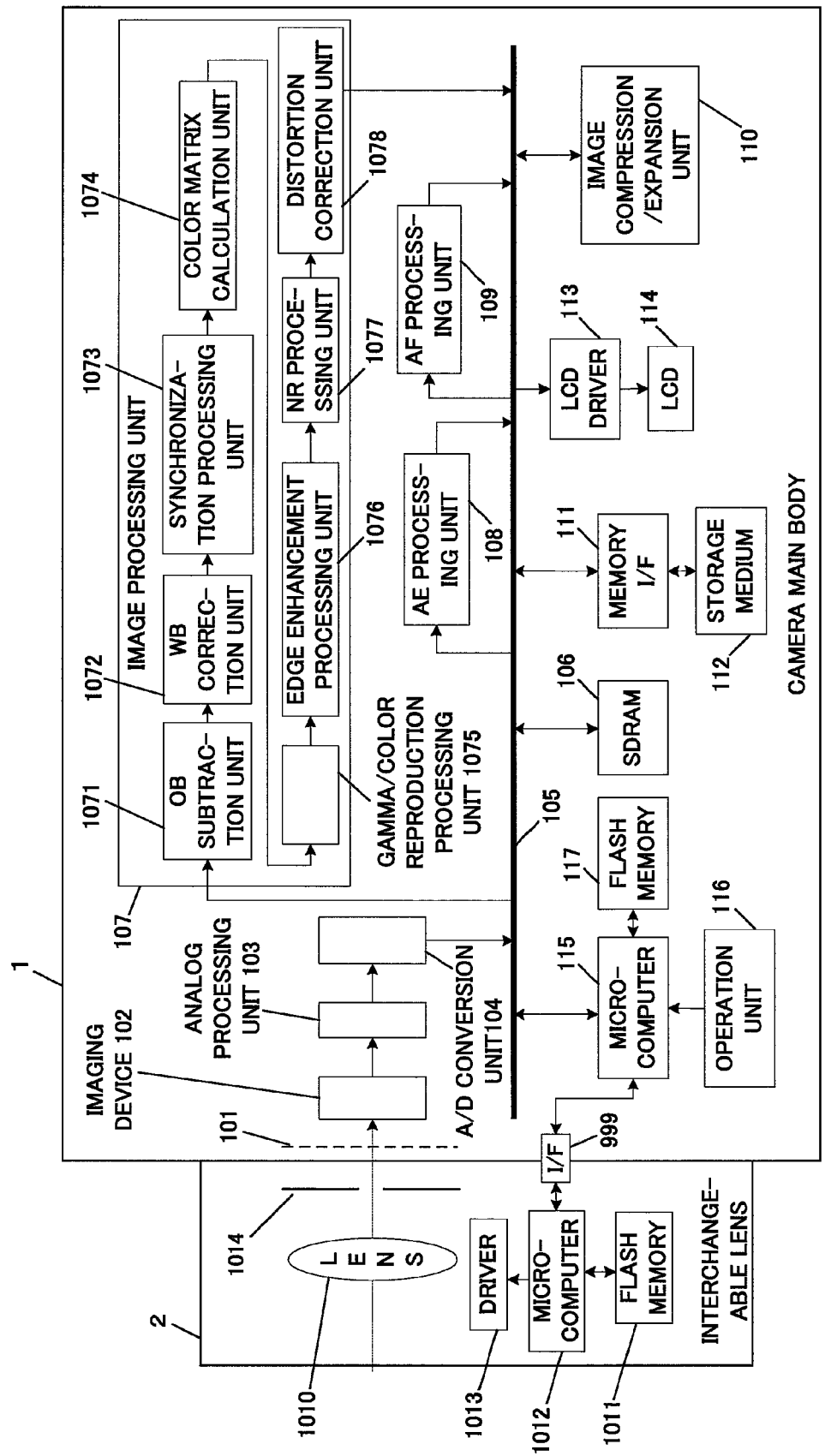
FIG. 1 is a block diagram showing the constitution of a digital still camera to which an image processing apparatus according to a first embodiment is applied.

FIG. 1 is a block diagram showing the constitution of a digital still camera to which an image processing apparatus according to a first embodiment is applied. The digital still camera shown in FIG. 1 comprises a camera main body 1 and an interchangeable lens 2.

The interchangeable lens 2 includes a lens 1010, a flash memory 1011, a microcomputer 1012, a driver 1013, and a diaphragm 1014. The interchangeable lens 2 is connected communicably to the camera main body 1 via an I/F 999.

The camera main body 1 includes a mechanical shutter 101, an imaging device 102, an analog processing unit 103, an analog/digital conversion unit 104 (A/D conversion unit 104 hereafter), a bus 105, an SDRAM 106, an image processing unit 107, an AE processing unit 108, an AF processing unit 109, an image compression/expansion unit 110, a memory interface 111 (memory I/F 111 hereafter), a storage medium 112, an LCD driver 113, an LCD 114, a microcomputer 115, an operation unit 116, and a flash memory 117.

The lens 1010 condenses an optical image of a subject onto the imaging device 102. The lens 1010 may be a single-vision lens or a zoom lens.

The microcomputer 1012 is connected to the I/F 999, the flash memory 1011 and the driver 1013 to read and write information stored in the flash memory 1011 and control the driver 1013. The information stored in the Flash memory 1011 includes distortion characteristic data corresponding to a focal length and a focus position of the interchangeable lens 2, data relating to an MTF (Modulation Transfer Function) characteristic of the interchangeable lens 2, and so on.

Further, the microcomputer 1012 is capable of communicating with the microcomputer 115 via the I/F 999 to transmit various information to the microcomputer 115 and receive information such as an aperture value from the microcomputer 115.

Upon reception of an instruction from the microcomputer 1012, the driver 1013 drives the lens 1010 to modify a focal distance and a focus position and drive the diaphragm 1014. The diaphragm 1014 is provided in the vicinity of the lens 1010 to adjust a light quantity of the object.

The mechanical shutter 101 is driven upon reception of an instruction from the microcomputer 115 to control the time during which the object is exposed to the imaging device 102.

The imaging device 102 is formed such that color filters in a Bayer arrangement are disposed on a front surface of a photodiode constituting each pixel. In the Bayer arrangement, a line on which an R pixel and a G (Gr) pixel are disposed alternately in a horizontal direction and a line on which a G (Gb) pixel and a B pixel are disposed in the horizontal direction are provided, and the two lines are disposed alternately in a vertical direction. The imaging device 102 receives light condensed by the lens 1010 on the photodiodes constituting the pixels and performs photoelectric conversion such that a light quantity is output to the analog processing unit 103 as an electric charge quantity. The imaging device 102 may be a CMOS device or a CCD device.

The analog processing unit 103 reduces reset noise and the like and then performs waveform shaping on an electric signal (analog image signal) read from the imaging device 102, and also performs gain-up processing to obtain a target brightness. The A/D conversion unit 104 converts the analog image signal output from the analog processing unit 103 into a digital image signal (to be referred to hereafter as image data).

The bus 105 is a transfer path for transferring various data generated in the interior of the digital camera to the various internal units of the digital camera. The bus 105 is connected to the A/D conversion unit 104, the SDRAM 106, the image processing unit 107, the AE processing unit 108, the AF processing unit 109, the image compression/expansion unit 110, the memory I/F 111, the LCD driver 113, and the microcomputer 115.

The image data output from the A/D conversion unit 104 are stored temporarily in the SDRAM 106 via the bus 105. The SDRAM 106 is a storage unit for temporarily storing various data such as the image data obtained in the A/D conversion unit 104 and image data processed in the image processing unit 107 and the image compression/expansion unit 110.

The image processing unit 107 includes an optical black subtraction unit 1071 (OB subtraction unit 1071 hereafter), a white balance correction unit 1072 (WB correction unit 1072 hereafter), a synchronization processing unit 1073, a color matrix calculation unit 1074, a gamma/color reproduction processing unit 1075, an edge enhancement processing unit 1076, a noise reduction processing unit 1077 (NR processing unit 1077 hereafter), and a distortion correction unit 1078, and implements various types of image processing on image data read from the SDRAM 106.

The OB subtraction unit 1071 performs optical black subtraction processing (OB subtraction processing hereafter) on the image data. OB subtraction processing is processing for subtracting an optical black value (OB value hereafter) attributable to a dark current or the like of the imaging device 102 from a pixel value of each pixel constituting the image data.

The WB correction unit 1072 performs white balance correction processing by multiplying a white balance gain corresponding to a white balance mode by the image data. The white balance mode may be set by a user in accordance with light sources including clear sky, cloudy sky, an incandescent lamp, and a fluorescent lamp.

The synchronization processing unit 1073 synchronizes image data in the Bayer arrangement into image data in which R, G, B information is included in each pixel. The color matrix calculation unit 1074 corrects the colors of the image data by performing a linear transformation in which a color matrix is multiplied by the image data. The gamma/color reproduction processing unit 1075 performs gamma correction processing and color reproduction processing for varying the tint of the image.

The edge enhancement processing unit 1076 performs edge enhancement processing on the image data by extracting an edge from the image data, multiplying the data relating to the extracted edge by a predetermined gain, and then adding the result to the image data.

The NR processing unit 1077 performs noise reduction processing through processing employing a filter that reduces high frequencies, coring processing, and so on.

The distortion correction unit 1078 performs distortion correction processing by partially enlarging/reducing the image on the basis of the distortion characteristic of the interchangeable lens 2. It should be noted that processing for correcting distortion by partially enlarging/reducing an image on the basis of a distortion characteristic of a lens is well known.

Following the various processing performed by the image processing unit 107, the image data are stored in the SDRAM 106.

The AE processing unit 108 calculates an object luminance from the image data. Data for calculating the object luminance may be constituted by an output of a dedicated photometric sensor. The AF processing unit 109 extracts a high frequency component signal from the image data and obtains a focus evaluation value through AF (Auto Focus) integration processing.

When still image data are recorded, the image compression/expansion unit 110 reads the image data from the SDRAM 106, compresses the read image data in accordance with a JPEG compression format, and temporarily stores the compressed JPEG image data in the SDRAM 106. The microcomputer 115 creates a JPEG file by attaching a JPEG header required to construct a JPEG file to the JPEG image data stored in the SDRAM 106, and records the created JPEG file in the recording medium 112 via the memory I/F 111.

When moving image data are recorded, the image compression/expansion unit 110 reads the moving image data from the SDRAM 106, compresses the read moving image data in accordance with the H.264 format, for example, and temporarily stores the compressed moving image data in the SDRAM 106. Further, the image compression/expansion unit 110 performs processing to expand the compressed data on the basis of a command from the microcomputer 115.

The recording medium 112 is constituted by a memory card that can be attached to and detached from the camera main body 1, for example, but is not limited thereto.

The LCD driver 113 displays an image on the LCD 114. Image display includes quick view display in which image data are displayed briefly immediately after image pickup, reproduction display of a JPEG file recorded in the recording medium 112, and moving image display such as live view display. When the compressed data recorded in the recording medium 112 are to be reproduced, the image compression/expansion unit 110 reads the compressed data recorded in the recording medium 112, implements expansion processing thereon, and then temporarily stores the expanded data in the SDRAM 106. The LCD driver 113 performs display by reading the expanded data from the SDRAM 106, converting the read data into an image signal, and then outputting the image signal to the LCD 114.

The microcomputer 115, which functions as a control unit, controls various sequences of the digital camera main body 1 comprehensively. The operation unit 116 and the flash memory 117 are connected to the microcomputer 115.

The operation unit 116 is constituted by operating members such as a power button, a release button, a moving image button and various types of input keys. The microcomputer 115 performs various types of sequences according to the operation of either of the operation members of the operation unit 116 performed by the user. A power button is an operation member for performing ON/OFF directions of the power of the digital camera. When the power button is pushed, the power of the digital camera is turned on. When the power button is pushed again, the power of the digital camera is turned off. The release button is arranged to include two-step switches, which consists of a first release switch and a second release switch. When the release button is half-pushed to turn the first release switch on, the microcomputer 115 performs the shooting preparation sequences such as AE processing and AF processing. When the release button is fully-pushed to turn the second release switch on, the microcomputer 115 performs the shooting by executing the shooting sequences.

The moving image button is a button for starting and terminating a moving image pickup operation. In an initial state, a moving image is not picked up, and therefore, when the moving image button is pressed in this state, moving image pickup begins. When the moving image button is pressed during moving image pickup, moving image pickup is terminated. Hence, every time the moving image button is pressed, moving image pickup is started and stopped alternately.

The flash memory 117 stores various parameters required to operate the digital camera, such as white balance gains corresponding to white balance modes and a low pass filter coefficient, a serial number identifying the digital still camera, and so on. Moreover, various types of programs which are to be executed by the microcomputer 115 are also stored in the flash memory 117. The microcomputer 115 reads from the flash memory 117 parameters required for various types of sequences and executes the processing according to the program stored in the flash memory 117.

Figure 2:
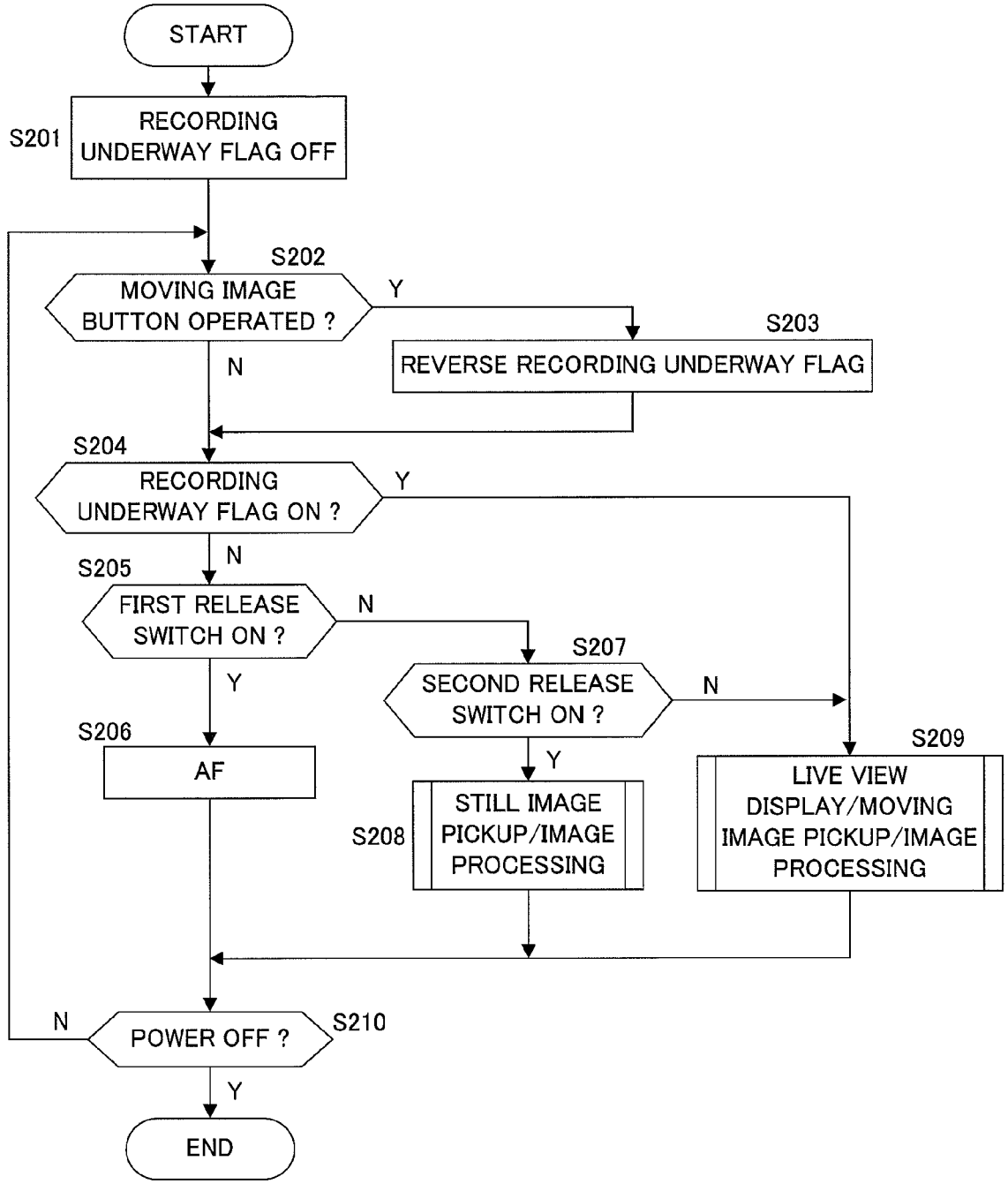
FIG. 2 is a flowchart showing a main processing flow performed by the digital still camera to which the image processing apparatus according to the first embodiment is applied.

FIG. 2 is a flowchart showing a main processing flow performed by the digital still camera to which the image processing apparatus according to the first embodiment is applied. When a user presses the power supply button to turn the power of the digital still camera ON, the microcomputer 115 begins processing of a step S201.

In the step S201, a recording underway flag is initialized to OFF. The recording underway flag is a flag that turns ON during moving image pickup and turns OFF when moving image pickup is not underway.

In a step S202, a determination is made as to whether or not the moving image button has been operated by the user. When it is determined that the moving image button has been operated, the routine advances to a step S203, and when it is determined that the button has not been operated, the routine advances to a step S204.

In the step S203, the recording underway flag is reversed, whereupon the routine advances to the step S204. As noted above, moving image pickup is started and stopped alternately every time the moving image button is pressed, and therefore in this step, the recording underway flag is reversed such that if the flag was OFF it is turned ON and if it was ON it is turned OFF.

In the step S204, a determination is made as to whether or not the recording underway flag is ON. When it is determined that the recording underway flag is ON, the routine advances to a step S209. When it is determined in the step S209 that moving image recording is underway, image processing and image compression are implemented on moving image data based on an image signal from the imaging device 102, whereupon the moving image data are recorded in the recording medium 112. When it is determined that moving image recording is not underway, live view display is performed for the user to determine an object composition and a shutter timing for the purpose of still image pickup. The live view display/moving image pickup/image processing of the step S209 will be described in detail below using FIG. 4.

When it is determined in the step S204 that the recording underway flag is OFF, on the other hand, the routine advances to a step S205. In the step S205, a determination is made as to whether or not a release button has been half-pressed by the user such that the first release switch is switched ON. When it is determined that the first release switch has been switched ON, the routine advances to a step S206.

In the step S206, AF processing is performed. More specifically, first, a focus evaluation value is calculated by the AF processing unit 109. The microcomputer 115 then issues a command to drive the lens 1010 to the driver 1013 on the basis of the focus evaluation value. The driver 1013 drives the lens 1010 on the basis of the command to modify the focal length and the focus position.

When the first release switch has not been switched ON in the step S205, or when the first release switch remains switched ON, the routine advances to a step S207. In the step S207, a determination is made as to whether or not the release button has been fully pressed by the user such that the second release switch is switched ON. When it is determined that the second release switch has been switched ON, the routine advances to a step S208, and when it is determined that the second release switch has not been switched ON, the routine advances to the step S209.

In the step S208, still image pickup/image processing is performed. The still image pickup/image processing will be described in detail below using FIG. 3.

In a step S210, a determination is made as to whether or not the power supply of the digital still camera has been switched OFF. When it is determined that the power supply has not been switched OFF, the routine returns to the step S202, whereupon the processing described above is performed. When the user presses the power supply button to switch the power supply OFF, on the other hand, the processing of the flowchart is terminated.

Hence, in the main flow according to this embodiment, a still image pickup mode is set as an initial setting, and in this state, the steps S202→S204→S205→S207→S209→S210→S202 are executed in sequence while performing live view display. When the release button is half-pressed during the live view display, an AF operation is performed in the step S206, and when the release button is fully pressed, still image pickup is performed in the step S208. Further, when the moving image button is pressed, the recording underway flag is switched ON in the step S203, whereupon the steps S204→S209→S210→S202→S204 are executed repeatedly to continue the moving image pickup. When the moving image button is pressed again in this state, the recording underway flag is switched OFF in the step S203, whereupon the routine returns to the still image flow described above.

Figure 3:
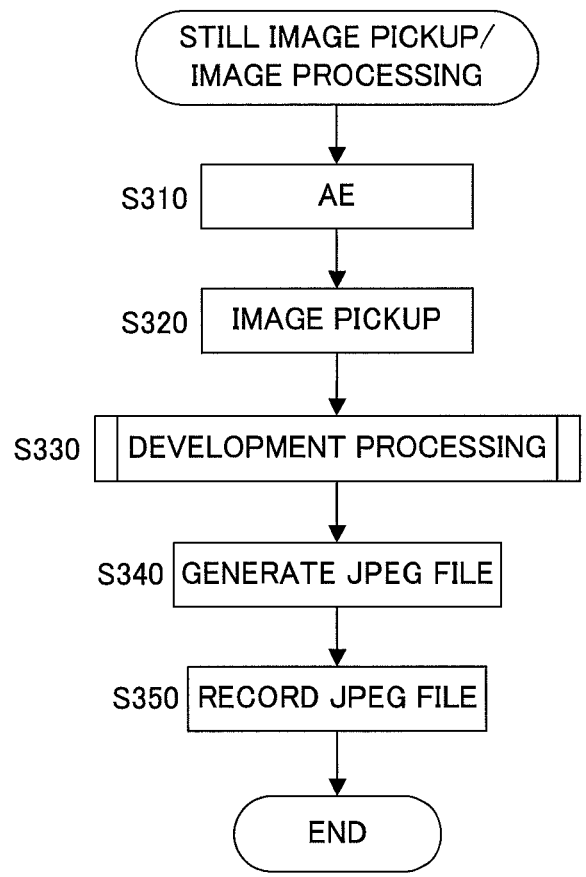
FIG. 3 is a flowchart showing in detail still image pickup/image processing.

FIG. 3 is a flowchart showing in detail the processing of the step S208 in the flowchart shown in FIG. 2, or in other words the still image pickup/image processing.

In a step S310, AE processing is performed. More specifically, an object luminance is calculated in the AE processing unit 108, and by referring to an exposure condition determination table stored in the Flash memory 117 on the basis of the calculated object luminance, an ISO sensitivity, an aperture, and a shutter speed of the image pickup operation are determined.

In a step S320, image pickup is performed. The image pickup (still image pickup) is performed using a similar method to a conventionally employed method. The driver 1013 drives the diaphragm 1014 on the basis of an instruction from the microcomputer 1012 to achieve a set aperture value. Image pickup is then performed by controlling the mechanical shutter 101 on the basis of the determined shutter speed, whereby image data corresponding to the determined ISO sensitivity are obtained.

In a step S330, development processing is performed by implementing various types of image processing on the image data (Bayer data) obtained in the image pickup operation of the step S320 and converting the image data into luminance (Y) and color difference (Cb, Cr) signal data. The development processing will be described in detail below using FIG. 5.

In a step S340, JPEG compression is performed on the image data in the image compression/expansion unit 110, whereupon a JPEG file is generated by attaching header information such as an image size and image pickup conditions.

In a step S350, the JPEG file generated in the step S340 is recorded in the recording medium 112 via the memory I/F 111.

Figure 4:
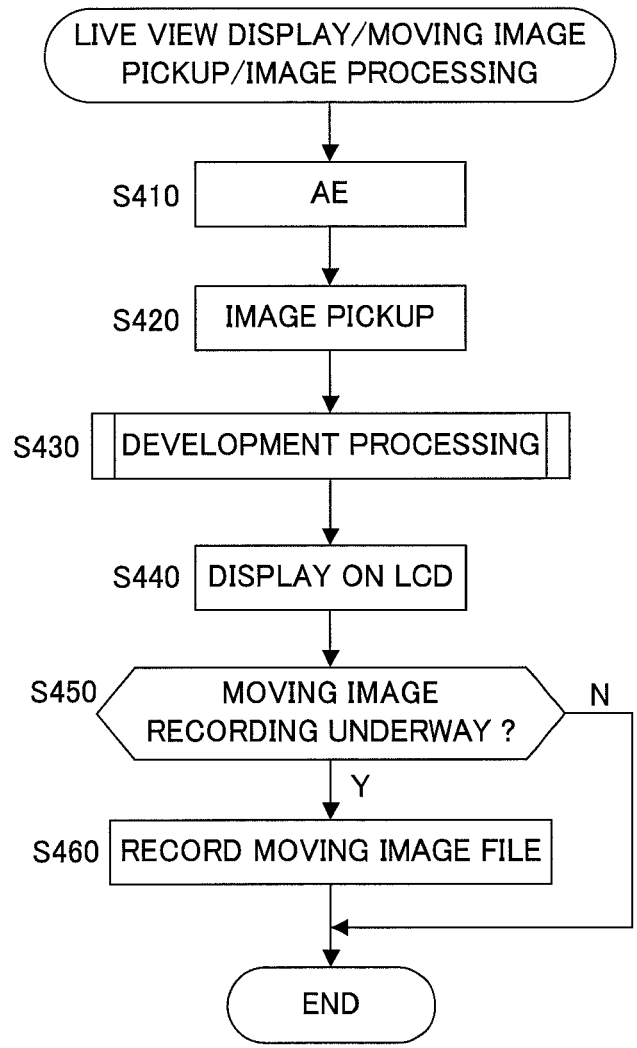
FIG. 4 is a flowchart showing in detail live view display/moving image pickup/image processing.

FIG. 4 is a flowchart showing in detail the processing of the step S209 in the flowchart shown in FIG. 2, or in other words the live view display/moving image pickup/image processing.

In a step S410, AE processing is performed. This processing is identical to the processing of the step S310 in the flowchart shown in FIG. 3.

In a step S420, image pickup is performed. The image pickup (moving image pickup) is performed using a similar method to a conventionally employed method. In other words, image pickup is performed by controlling a so-called electronic shutter on the basis of the determined aperture, shutter speed, and ISO sensitivity.

In a step S430, development processing is performed by implementing various types of image processing on the image data (Bayer data) obtained in the image pickup operation of the step S420 and converting the image data into luminance (Y) and color difference (Cb, Cr) signal data. The development processing will be described in detail below using FIG. 5.

In a step S440, the image data are displayed on the LCD 114 by the LCD driver 113. This display is so-called live view display.

In a step S450, a determination is made as to whether or not moving image recording is underway. When the recording underway flag is OFF, it is determined that moving image recording is not underway and therefore the processing of this flowchart is terminated. When the recording underway flag is ON, it is determined that moving image recording is underway and the routine advances to a step S460.

In the step S460, a moving image file is generated and recorded in the recording medium 112. More specifically, compression corresponding to the format of the moving image file is performed on the image data in the image compression/expansion unit 110, whereupon a moving image file is generated by attaching predetermined header information. Moving image file compression formats include "H.264", "Motion JPEG", and "MPEG". The generated moving image file is then recorded in the recording medium 112 via the memory I/F 111.

Figure 5:
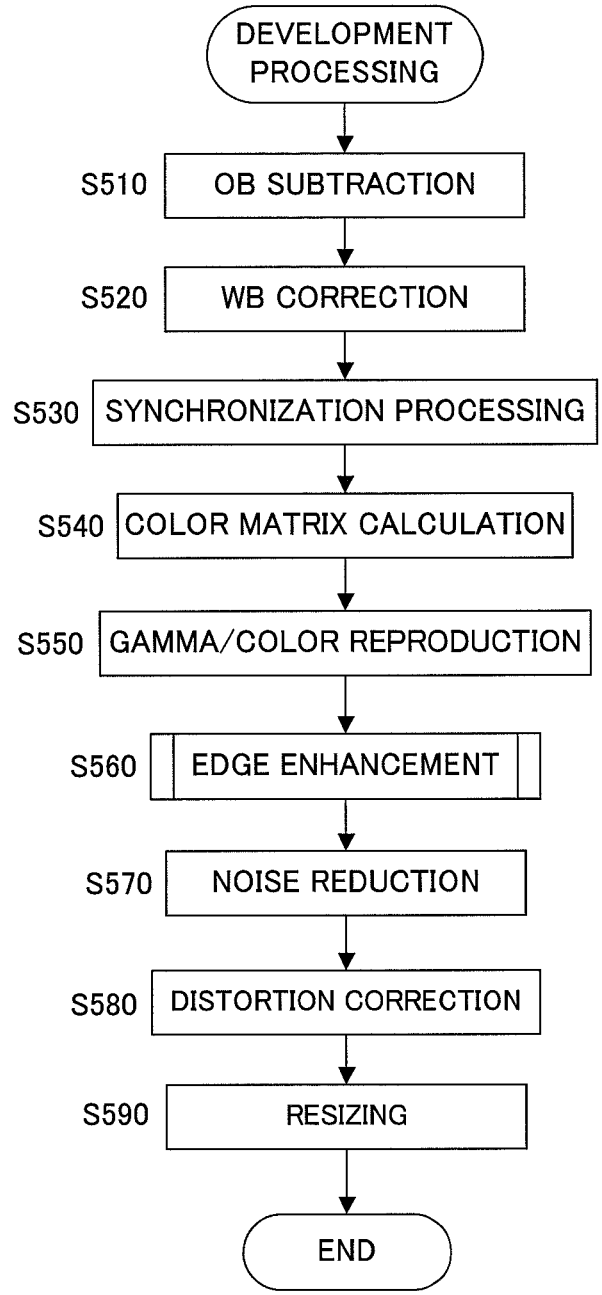
FIG. 5 is a flowchart showing in detail development processing.

FIG. 5 is a flowchart showing in detail the processing of the step S330 in the flowchart shown in FIG. 3 and the processing of the step S430 of the flowchart shown in FIG. 4, i.e. the development processing.

In a step S510, OB subtraction processing for subtracting an OB value obtained during image pickup from the image data obtained during image pickup is implemented by the OB subtraction unit 1071.

In a step S520, the WB correction unit 1072 implements white balance correction processing on the image data subjected to the OB subtraction processing by multiplying a white balance gain corresponding to a white balance mode by the image data. It should be noted that the white balance mode can be set by the user for each image pickup operation by operating an input key included in the operation unit 116. The microcomputer 115 sets the white balance mode on the basis of an operation of the operation unit 116 performed by the user. Alternatively, when the digital still camera includes an auto-white balance function for adjusting the white balance automatically, the microcomputer 115 sets a white balance mode corresponding to a light source at the time of the image pickup operation automatically.

In a step S530, the synchronization processing unit 1073 implements synchronization processing on the image data subjected to the white balance correction processing. In a step S540, the color matrix calculation unit 1075 performs a color matrix calculation on the image data subjected to the synchronization processing by multiplying a color matrix coefficient corresponding to the white balance mode by the image data.

In a step S550, the gamma/color reproduction processing unit 1074 performs gamma correction processing and color reproduction processing for varying an image tint on the image data subjected to the color matrix calculation.

In a step S560, the edge enhancement processing unit 1076 performs edge enhancement processing on the image data subjected to the gamma correction processing and the color reproduction processing. The edge enhancement processing will be described in detail below.

In a step S570, the NR processing unit 1077 performs noise reduction processing on the image data subjected to the edge enhancement processing. The noise reduction processing is coring processing based on coring parameters or processing employing a high-frequency reduction filter, which is performed on the basis of noise reduction parameters (NR parameters hereafter).

In a step S580, the distortion correction unit 1078 performs distortion correction processing corresponding to the distortion characteristic of the interchangeable lens 2 on the image data subjected to the noise reduction processing. For this purpose, the microcomputer 1012 reads distortion characteristic data corresponding to the focal length and the focus position of the interchangeable lens 2 from the Flash memory 1011 and determines the distortion characteristic at the time of image pickup by referring to the read distortion characteristic data on the basis of the focal length and focus position at the time of image pickup. The microcomputer 115 obtains information relating to the distortion characteristic at the time of image pickup from the microcomputer 1012 via the I/F 999 and performs distortion correction processing by partially enlarging/reducing the image on the basis of the obtained distortion characteristic.

In a step S590, resizing processing is performed to reduce or enlarge the image data subjected to distortion correction to a suitable image size for recording or display. This processing may be performed by the image processing unit 107 or the microcomputer 115.

Figure 6:
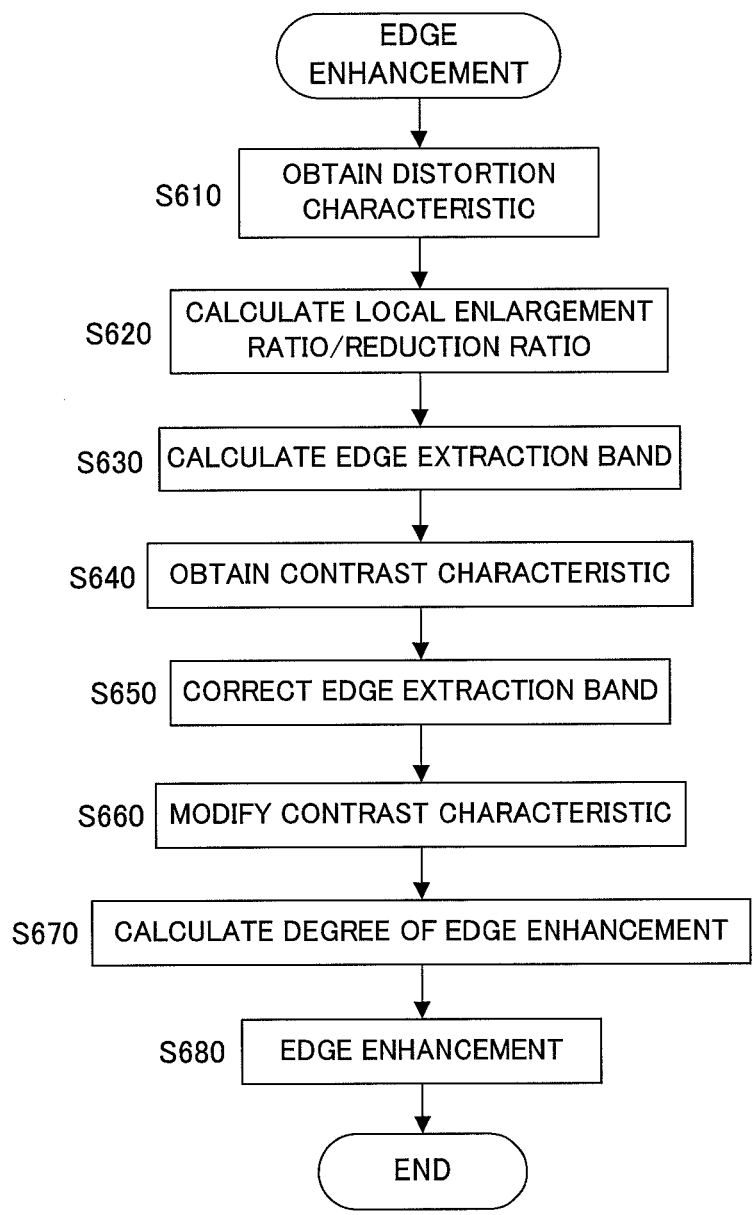
FIG. 6 is a flowchart showing in detail edge enhancement processing.

FIG. 6 is a flowchart showing in detail the processing of the step S560 in the flowchart shown in FIG. 5, or in other words the edge enhancement processing.

In a step S610, the distortion characteristic of the interchangeable lens 2 is obtained. This processing method is identical to the method of obtaining distortion characteristic information in the step S580 of the flowchart shown in FIG. 5, and therefore detailed description thereof has been omitted.

Figure 7:
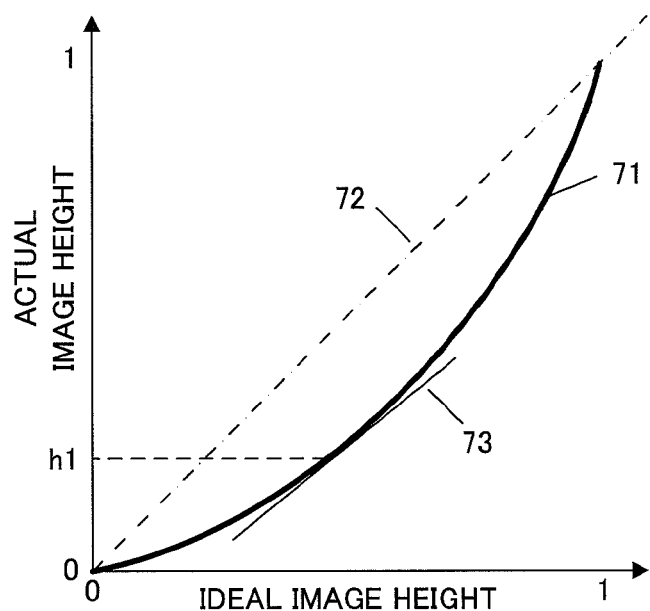
FIG. 7 is a view showing an example of a distortion characteristic of the interchangeable lens.

FIG. 7 is a view showing an example of a distortion characteristic of the interchangeable lens 2. A solid line 71 indicates the distortion characteristic (a pincushion distortion characteristic) of the interchangeable lens 2, and a dot-dash line 72 indicates a characteristic in a case where no distortion exists. In FIG. 7, the abscissa shows an ideal image height and the ordinate shows an actual image height. The ideal image height is an image height on an ideal image having no distortion, and the actual image height is an image height on an image obtained in an actual image pickup operation. Further, the image height is a distance from an image center, and here, the image height in the image center is set at 0 and the image height at the four corners of the image is set at 1.

In a step S620 of FIG. 6, the distortion correction unit 1078 calculates an enlargement ratio or a reduction ratio for use during local enlargement/reduction processing in relation to each pixel of the image data. First, the image height (actual image height) of each pixel is calculated. A slope of the distortion characteristic in the calculated image height position is then determined on the basis of the distortion characteristic obtained in the step S610. The slope of the distortion characteristic in the calculated image height position is the slope of a tangent contacting a curve of the distortion characteristic shown in FIG. 7. For example, referring to FIG. 7, the slope of the distortion characteristic in the position of an image height h1 corresponds to the slope of a tangent 73. When the slope is less than 1, distortion correction processing is performed to enlarge the image, and when the slope is equal to or larger than 1, distortion correction processing is performed to reduce the image. Here, data defining a relationship between the slope of the distortion characteristic and the enlargement ratio or the reduction ratio are prepared in advance, and the enlargement ratio or reduction ratio is calculated by referring to these data on the basis of the determined slope.

In a step S630, a frequency band (to be referred to hereafter as an edge extraction band) in which an edge is to be extracted from the image is calculated. Here, an edge extraction band serving as a reference (to be referred to hereafter as a reference edge extraction band) is determined in advance, and a frequency band that moves steadily toward a high frequency side of the reference edge extraction band as the enlargement ratio determined in the step S620 increases is set in relation to each pixel as the edge extraction band. The reason for this is that in an enlarged image, a contrast component is further toward a low frequency side than in a pre-enlargement image. Further, a frequency band that moves steadily toward a low frequency side of the reference edge extraction band as the reduction ratio increases is set as the edge extraction band. In other words, both when the image is enlarged and when the image reduced, edge enhancement is performed in an identical frequency band of the enlarged/reduced image. A relationship between the enlargement ratio or reduction ratio and the amount by which the frequency band is shifted from the reference edge extraction band may be determined in advance.

In a step S640, the MTF characteristic of the interchangeable lens 2 is obtained from the Flash memory 1011, whereupon a contrast characteristic corresponding to the frequency of the captured image is calculated taking into account a pixel pitch and a pixel count of the imaging device 102 and a characteristic of an optical low-pass filter.

Figure 8:
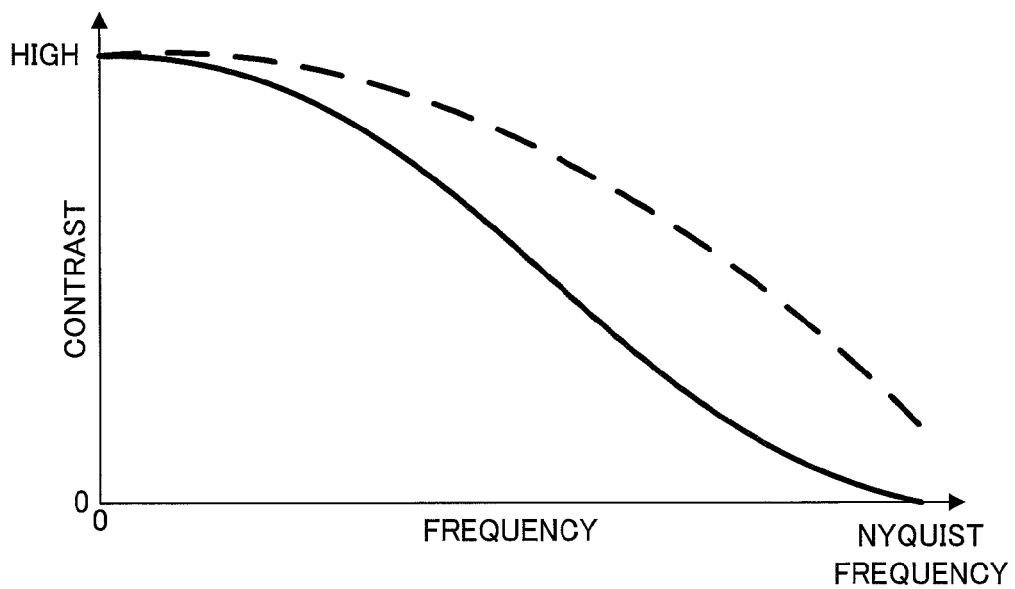
FIG. 8 is a view showing an example of an MTF characteristic of the interchangeable lens and an example of a contrast characteristic calculated on the basis of the MTF characteristic.

A dotted line in FIG. 8 shows an example of the MTF characteristic of the interchangeable lens 2 obtained from the Flash memory 1011, while a solid line shows an example of the contrast characteristic calculated on the basis of the obtained MTF characteristic. The abscissa in FIG. 8 shows the frequency and the ordinate shows the contrast.

In a step S650, the edge extraction band calculated in the step S630 is corrected. Here, correction is performed on the basis of the contrast characteristic calculated in the step S640 such that when a pixel in which the contrast corresponding to the frequency of the edge extraction band is lower than a predetermined contrast lower limit value exists, the edge extraction band of that pixel is corrected to a frequency corresponding to the predetermined contrast lower limit value.

Figure 9:
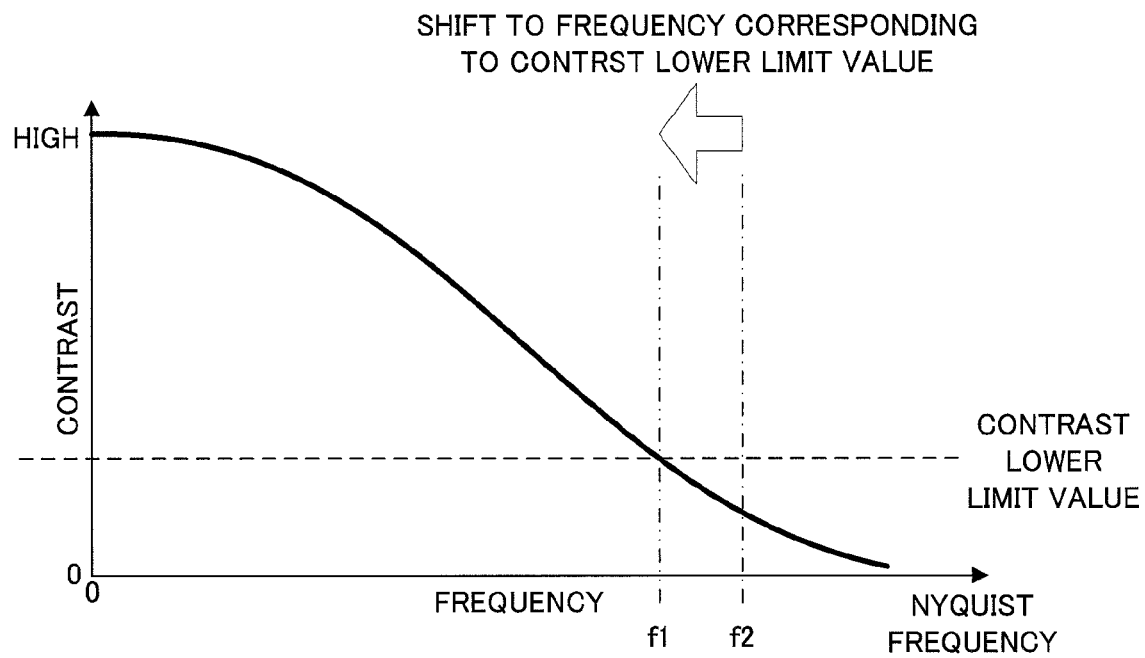
FIG. 9 is a view illustrating an edge extraction band correction method.

FIG. 9 is a view illustrating an edge extraction band correction method. A curve shown in FIG. 9 is identical to the curve shown in FIG. 8 in that it represents the contrast characteristic calculated on the basis of the MTF characteristic of the interchangeable lens 2. Referring to FIG. 9, when the edge extraction band (frequency) of a certain pixel is f2, the corresponding contrast is lower than the predetermined contrast lower limit value, and therefore the edge extraction band of this pixel is set at an edge extraction band (frequency) f1 corresponding to the contrast lower limit value.

In a step S660, a post-distortion correction contrast characteristic is determined for each pixel of the image data in accordance with the enlargement ratio or reduction ratio calculated in the step S620. It should be noted that since distortion correction is performed after edge enhancement processing, the post-distortion correction contrast characteristic denotes a contrast characteristic in a case where distortion correction is assumed to have been performed. More specifically, the contrast characteristic is modified such that a contrast component is shifted further toward the low frequency side as the enlargement ratio increases and further toward the high frequency side as the reduction ratio increases.

Figure 10:
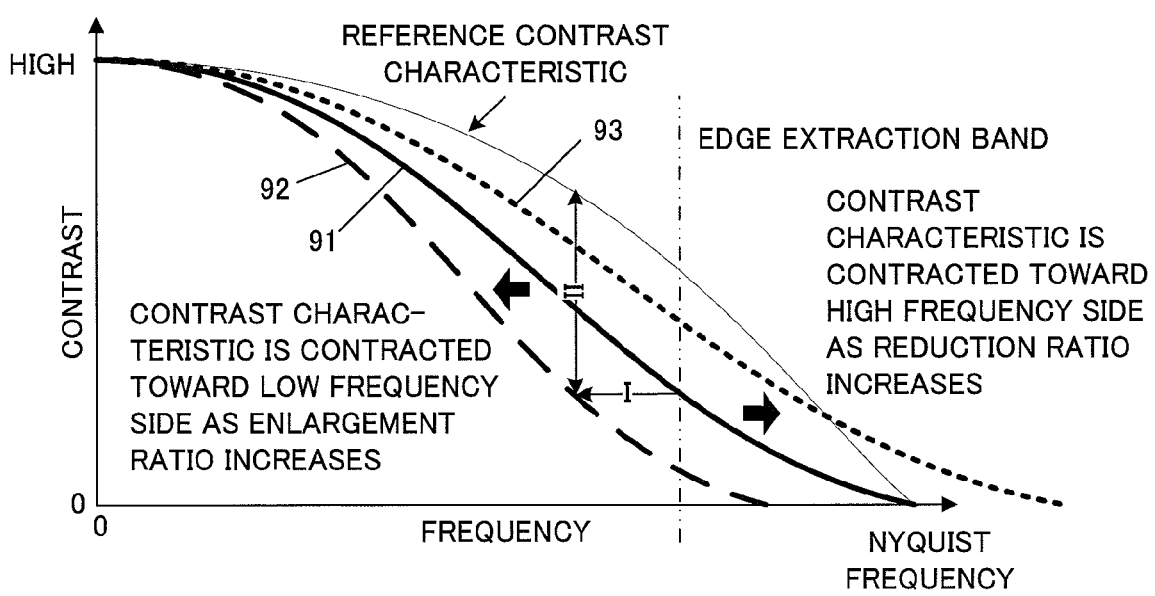
FIG. 10 is a view illustrating a method of calculating the post-distortion correction contrast characteristic.

FIG. 10 is a view illustrating a method of calculating the post-distortion correction contrast characteristic. A solid line 91 denotes the contrast characteristic calculated in the step S640. A dotted line 92 shows an example of a contrast characteristic contracted to the low frequency side in accordance with the enlargement ratio, and a dotted line 93 shows an example of a contrast characteristic stretched to the high frequency side in accordance with the reduction ratio.

In a step S670, a degree of edge enhancement is determined for each pixel of the image data. First, an edge extraction band corresponding to the post-distortion correction contrast characteristic is determined on the basis of the contrast characteristic obtained in the step S640 and the contrast characteristic calculated in the step S660. For this purpose, a contrast corresponding to the edge extraction band determined in the step S630 is determined for each pixel by referring to the contrast characteristic (the solid line 91) calculated in the step S640. Next, an edge extraction band corresponding to the determined contrast is determined on the basis of the contrast characteristic (the dotted lines 92, 93) calculated in the step S660 (see I in FIG. 10). Finally, the degree of edge enhancement required to obtain a reference contrast in the determined edge extraction band is determined on the basis of a difference (II in FIG. 19) with the reference contrast. The contrast characteristic serving as a reference (to be referred to hereafter as a reference contrast characteristic) is determined in advance. Further, a relationship between the difference with the reference contrast and the degree of edge enhancement is determined in advance.

As described above, the post-distortion correction contrast characteristic is contracted toward the low frequency side as the enlargement ratio during distortion correction increases. Accordingly, the difference thereof with the reference contrast (II in FIG. 10) increases as the enlargement ratio during distortion correction increases, leading to an increase in the degree of edge enhancement. Further, the post-distortion correction contrast characteristic is stretched toward the high frequency side as the reduction ratio during distortion correction increases, and therefore the difference thereof with the reference contrast decreases, leading to a reduction in the degree of edge enhancement.

In a step S680 of the flowchart shown in FIG. 6, edge enhancement processing is performed on the basis of the edge extraction band corrected in the step S650 and the degree of edge enhancement calculated in the step S670. Here, data defining relationships between a plurality of band pass filter coefficients and a plurality of edge enhancement bands are prepared in advance, and by referring to these data, a band pass filter coefficient corresponding to the edge enhancement band that is closest to the calculated edge extraction band is determined. An edge component is extracted on the basis of the band pass filter coefficient, whereupon the edge is enhanced by adding a value obtained by multiplying the degree of edge enhancement by the extracted edge component to the luminance (Y) signal data of the image data.

In the image processing apparatus according to the first embodiment, distortion correction processing is performed by executing local enlargement processing or reduction processing corresponding to the optical distortion characteristic of the lens employed during image pickup on image data that have been subjected to edge enhancement processing. At this time, the edge enhancement processing applied to the image data to be subjected to the distortion correction processing is modified in accordance with the local enlargement processing or reduction processing using edge enhancement processing applied to image data that are not subjected to distortion correction processing as a reference. As a result, a partial reduction in the contrast of the post-distortion correction image can be suppressed, and the image contrast can be brought closer to a uniform condition.

Second Embodiment

Figure 11:
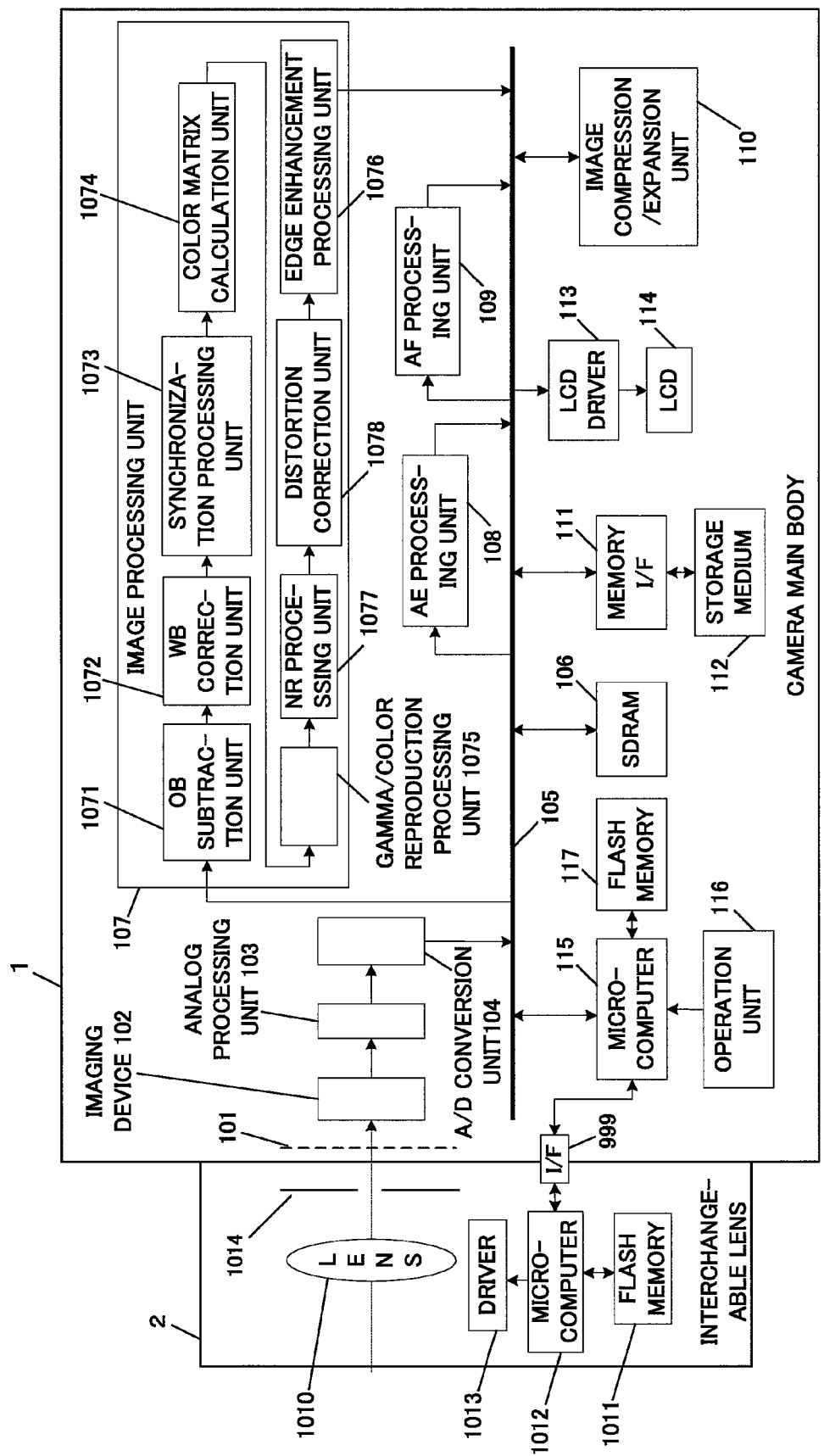
FIG. 11 is a block diagram showing the constitution of a digital still camera to which an image processing apparatus according to a second embodiment is applied.

FIG. 11 is a block diagram showing the constitution of a digital still camera to which an image processing apparatus according to a second embodiment is applied. This digital still camera differs from the digital still camera shown in FIG. 1 in the internal constitution of the image processing unit 107. More specifically, the NR processing unit 1077 is connected after the gamma/color reproduction processing unit 1075 and the edge enhancement processing unit 1076 is connected after the distortion correction unit 1078. The content of the processing performed in the interior of the respective processing units 1071 to 1078 is identical to that of the first embodiment.

Figure 12:
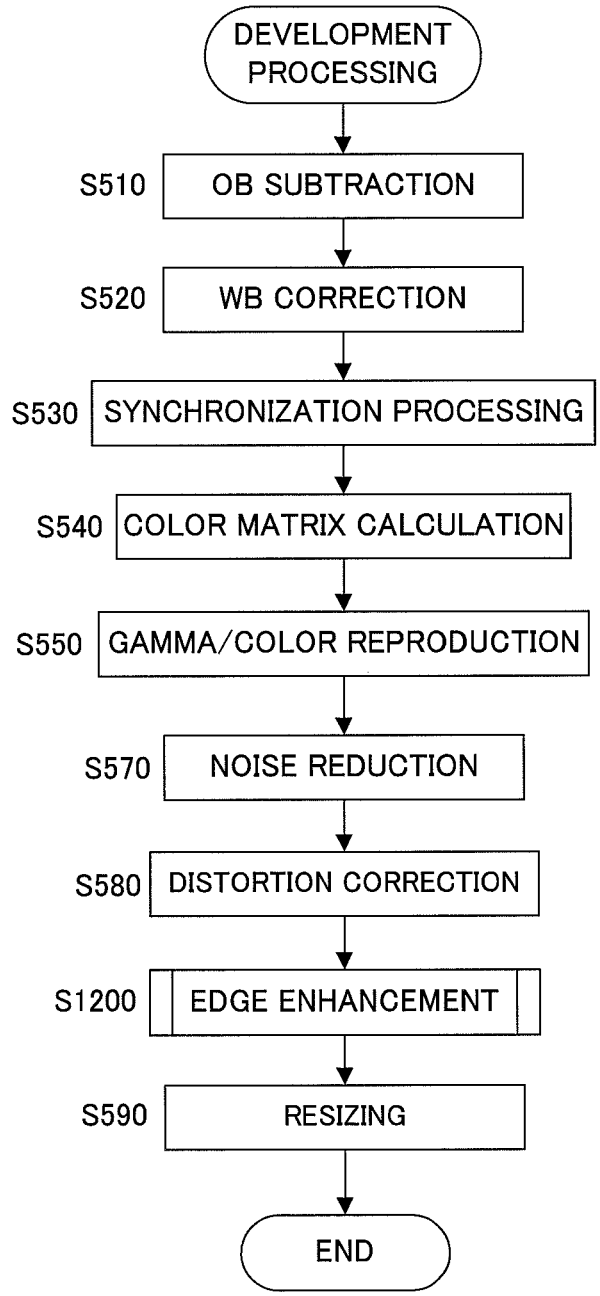
FIG. 12 is a flowchart showing in detail development processing executed by the image processing apparatus according to the second embodiment.

FIG. 12 is a flowchart showing in detail development processing executed by the image processing apparatus according to the second embodiment. Steps in which identical processing to the processing of the flowchart shown in FIG. 5 is performed have been allocated identical numbers and detailed description thereof has been omitted.

In the development processing performed by the image processing apparatus according to the second embodiment, the noise reduction processing (S570) performed by the NR processing unit 1077 and the distortion correction processing (S580) performed by the distortion correction unit 1078 are executed after the gamma correction processing and color reproduction processing (S550) performed by the gamma/color reproduction processing unit 1074. Edge enhancement processing (S1200) is then performed by the edge enhancement processing unit 1076, followed by the resizing processing (S590). In other words, edge enhancement processing is performed after distortion correction processing.

Figure 13:
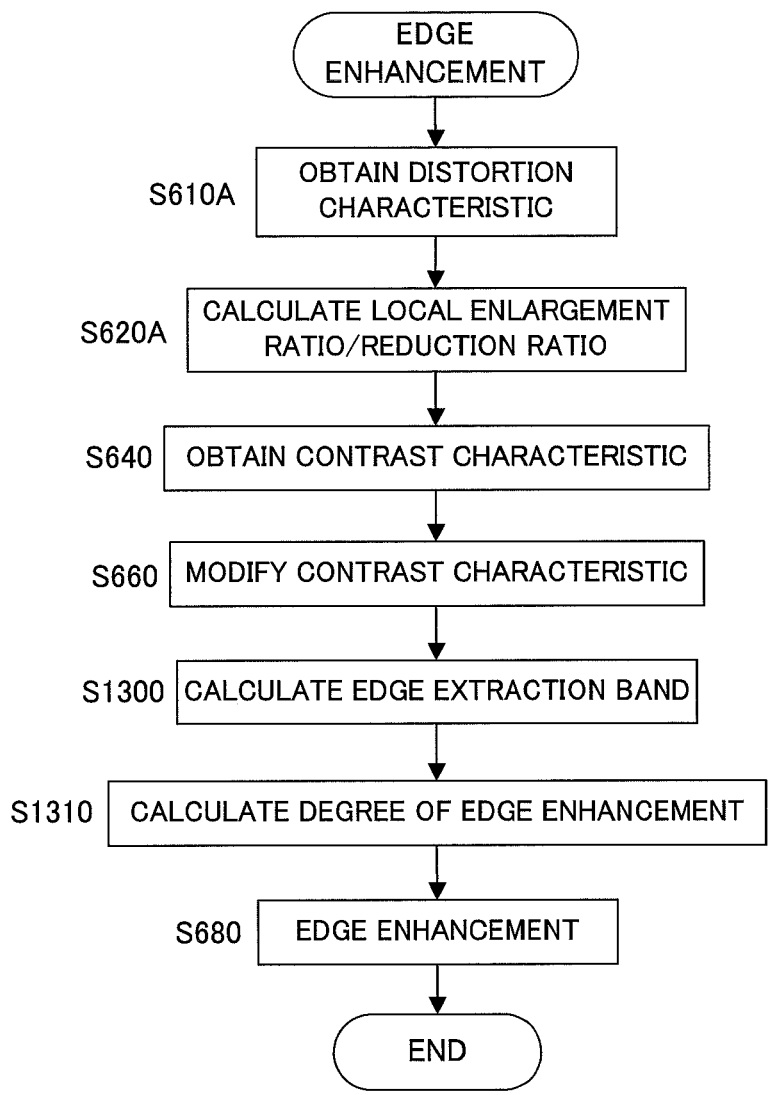
FIG. 13 is a flowchart showing in detail the edge enhancement processing according to the second embodiment.

FIG. 13 is a flowchart showing in detail the processing of the step S1200 in the flowchart shown in FIG. 12, or in other words the edge enhancement processing. Steps in which identical processing to the processing of the flowchart shown in FIG. 6 is performed have been allocated identical numbers and detailed description thereof has been omitted.

In a step S610A, the distortion characteristic of the interchangeable lens 2 is obtained. Since the distortion correction processing (step S580 in FIG. 12) is performed before the edge enhancement processing, the distortion characteristic has already been obtained, and therefore here, a distortion characteristic obtained in the distortion correction processing and stored in the SDRAM 106 is read. It should be noted that the distortion characteristic of the interchangeable lens 2 may be determined again by executing a similar method.

In a step S620A, the distortion correction unit 1078 calculates the enlargement ratio or reduction ratio for use during the local enlargement/reduction processing in relation to each pixel of the image data. Here, the enlargement ratio or reduction ratio calculated in the distortion correction processing is stored in the SDRAM 106 during distortion correction and read from the SDRAM 106 for use. It should be noted that the enlargement ratio or reduction ratio may be determined again by executing a similar method.

In the step S640, the MTF characteristic of the interchangeable lens 2 is obtained from the Flash memory 1011, whereupon the contrast characteristic corresponding to the frequency of the captured image is calculated taking into account the pixel pitch and pixel count of the imaging device 102. In the step S660, the post-distortion correction contrast characteristic is determined for each pixel of the image data in accordance with the enlargement ratio or reduction ratio determined in the step S620A.

In a step S1300, an edge extraction band is calculated for each pixel of the image data. For this purpose, first, a contrast corresponding to a preset reference edge extraction band is determined on the basis of the contrast characteristic determined in the step S650. When the determined contrast is lower than a predetermined contrast lower limit value, a frequency corresponding to the predetermined contrast lower limit value is set as the edge extraction band. When the determined contrast is higher than a predetermined contrast upper limit value, a frequency corresponding to the predetermined contrast upper limit value is set as the edge extraction band. When the determined contrast is equal to or higher than the predetermined contrast lower limit value and equal to or lower than the predetermined contrast upper limit value, the reference edge extraction band is set as the edge extraction band.

Figure 14:
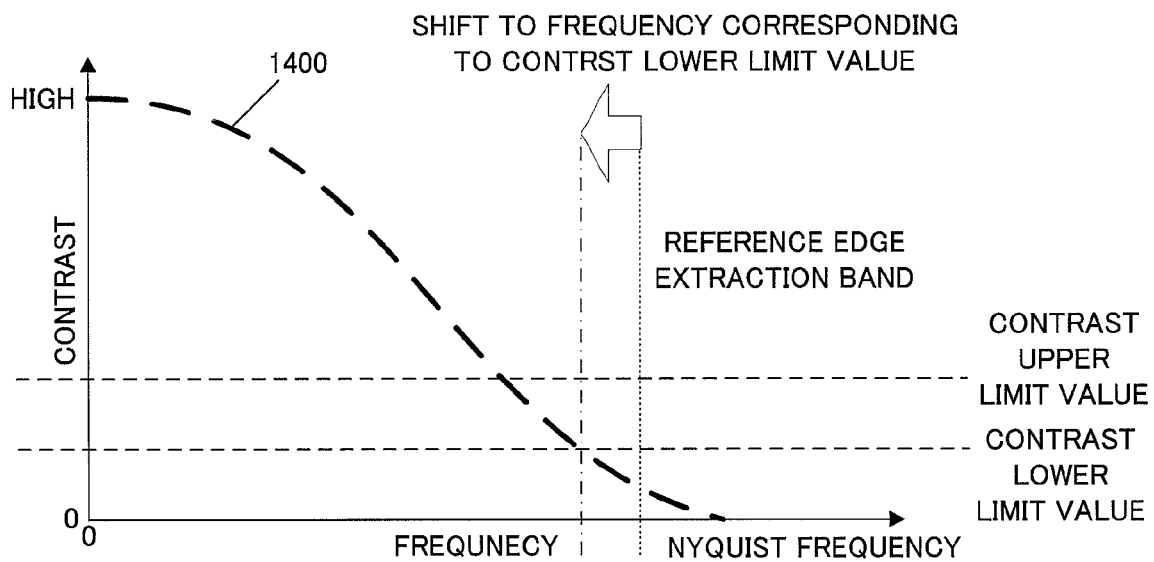
FIG. 14 is a view illustrating a method of calculating the edge extraction band in a case where a determined contrast is lower than a predetermined contrast lower limit value.

FIG. 14 is a view illustrating a method of calculating the edge extraction band in a case where the determined contrast is lower than the predetermined contrast lower limit value. A contrast characteristic 1400 is a contrast characteristic following distortion correction in accordance with the enlargement ratio. In this case, the contrast corresponding to the reference edge extraction band is lower than the predetermined contrast lower limit value, and therefore the frequency corresponding to the predetermined contrast lower limit value is set as the edge extraction band. In other words, the edge extraction band is shifted to the low frequency side of the reference edge extraction band. As a result, it is possible to avoid edge extraction processing based on a frequency band of the image in which edge extraction cannot be performed.

Figure 15:
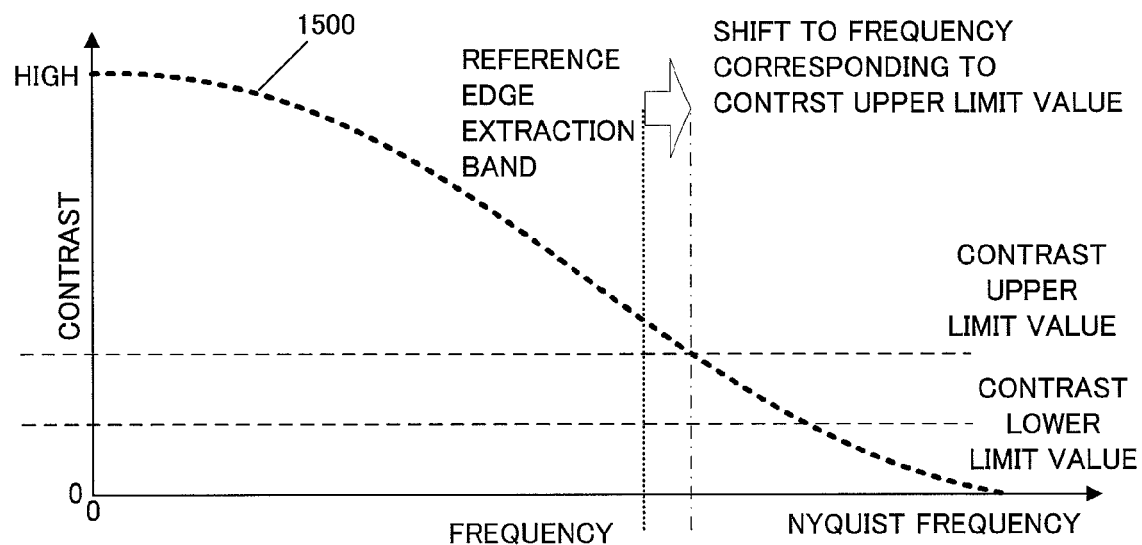
FIG. 15 is a view illustrating a method of calculating the edge extraction band in a case where a determined contrast is higher than a predetermined contrast upper limit value.

FIG. 15 is a view illustrating a method of calculating the edge extraction band in a case where the determined contrast is higher than the predetermined contrast upper limit value. A contrast characteristic 1500 is a contrast characteristic following distortion correction in accordance with the reduction ratio. In this case, the contrast corresponding to the reference edge extraction band is higher than the predetermined contrast upper limit value, and therefore the frequency corresponding to the predetermined contrast upper limit value is set as the edge extraction band. In other words, the edge extraction band is shifted to the high frequency side of the reference edge extraction band. As a result, an edge further toward the high frequency side can be enhanced.

It should be noted that the contrast lower limit value may be set on the high side such that when enlargement processing is performed during the distortion correction processing, the edge extraction band is always shifted to the low frequency side of the reference edge extraction band. Further, the contrast upper limit value may be set on the low side such that when reduction processing is performed during the distortion correction processing, the edge extraction band is always shifted to the high frequency side of the reference edge extraction band.

In a step S1310, a degree of edge enhancement is calculated. Here, a degree of edge enhancement required to obtain a reference contrast in the edge extraction band determined in the step S1300 is determined on the basis of a difference between a contrast corresponding to the post-distortion correction contrast characteristic in accordance with the enlargement ratio or reduction ratio determined in the step S650, and a predetermined reference contrast characteristic.

Figure 16:
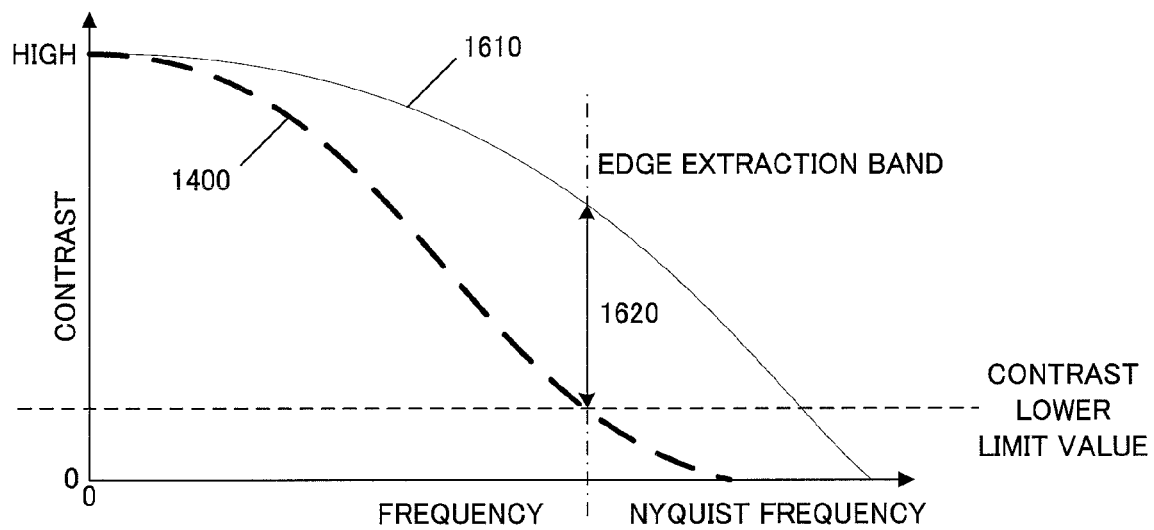
FIG. 16 is a view illustrating a method of calculating a degree of edge enhancement on the basis of a contrast characteristic following distortion correction in accordance with an enlargement ratio.

FIG. 16 is a view illustrating a method of calculating the degree of edge enhancement on the basis of the contrast characteristic following distortion correction in accordance with the enlargement ratio. The contrast characteristic 1400, similarly to the contrast characteristic 1400 shown in FIG. 14, is a contrast characteristic following distortion correction in accordance with the enlargement ratio. A difference 1620 between the contrast corresponding to the contrast characteristic 1400 and a contrast corresponding to a reference contrast characteristic 1610 within the edge extraction band determined in the step S1300 is determined, and the degree of edge enhancement is determined on the basis of the contrast difference 1620. Similarly to the first embodiment, the relationship between the contrast difference and the degree of edge enhancement is determined in advance.

Figure 17:
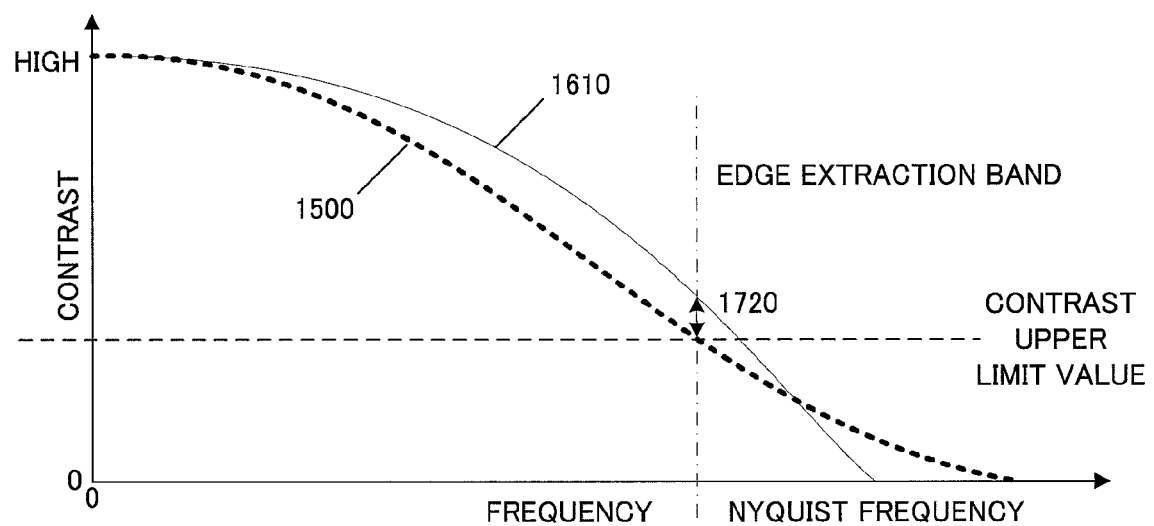
FIG. 17 is a view illustrating a method of calculating a degree of edge enhancement on the basis of a contrast characteristic following distortion correction in accordance with a reduction ratio.

FIG. 17 is a view illustrating a method of calculating the degree of edge enhancement on the basis of the contrast characteristic following distortion correction in accordance with the reduction ratio. The contrast characteristic 1500 is a contrast characteristic following distortion correction in accordance with the reduction ratio. Similarly to the contrast characteristic 1500 shown in FIG. 15, the contrast characteristic 1500 is a contrast characteristic following distortion correction in accordance with the reduction ratio. A difference 1720 between the contrast corresponding to the contrast characteristic 1500 and the contrast corresponding to the reference contrast characteristic 1610 within the edge extraction band determined in the step S1300 is determined, and the degree of edge enhancement is determined on the basis of the contrast difference 1720. As noted above, the relationship between the contrast difference and the degree of edge enhancement is determined in advance.

In the step S680 of the flowchart shown in FIG. 13, edge enhancement processing is performed on the basis of the edge extraction band calculated in the step S1300 and the degree of edge enhancement calculated in the step S1310.

In the image processing apparatus according to the second embodiment described above, edge enhancement processing is performed after performing distortion correction processing by performing local enlargement processing or reduction processing corresponding to the optical distortion characteristic of the lens employed during image pickup on the image data. At this time, the edge enhancement processing applied to the image data subjected to the distortion correction processing is modified in accordance with the local enlargement processing or reduction processing, and therefore a partial reduction in the contrast of the post-distortion correction image can be suppressed and the image contrast can be brought closer to a uniform condition.

Third Embodiment

The constitution of a digital still camera to which an image processing apparatus according to a third embodiment is applied is identical to the constitution of the digital still camera to which the image processing apparatus according to the first embodiment shown in FIG. 1 is applied.

Figure 18:
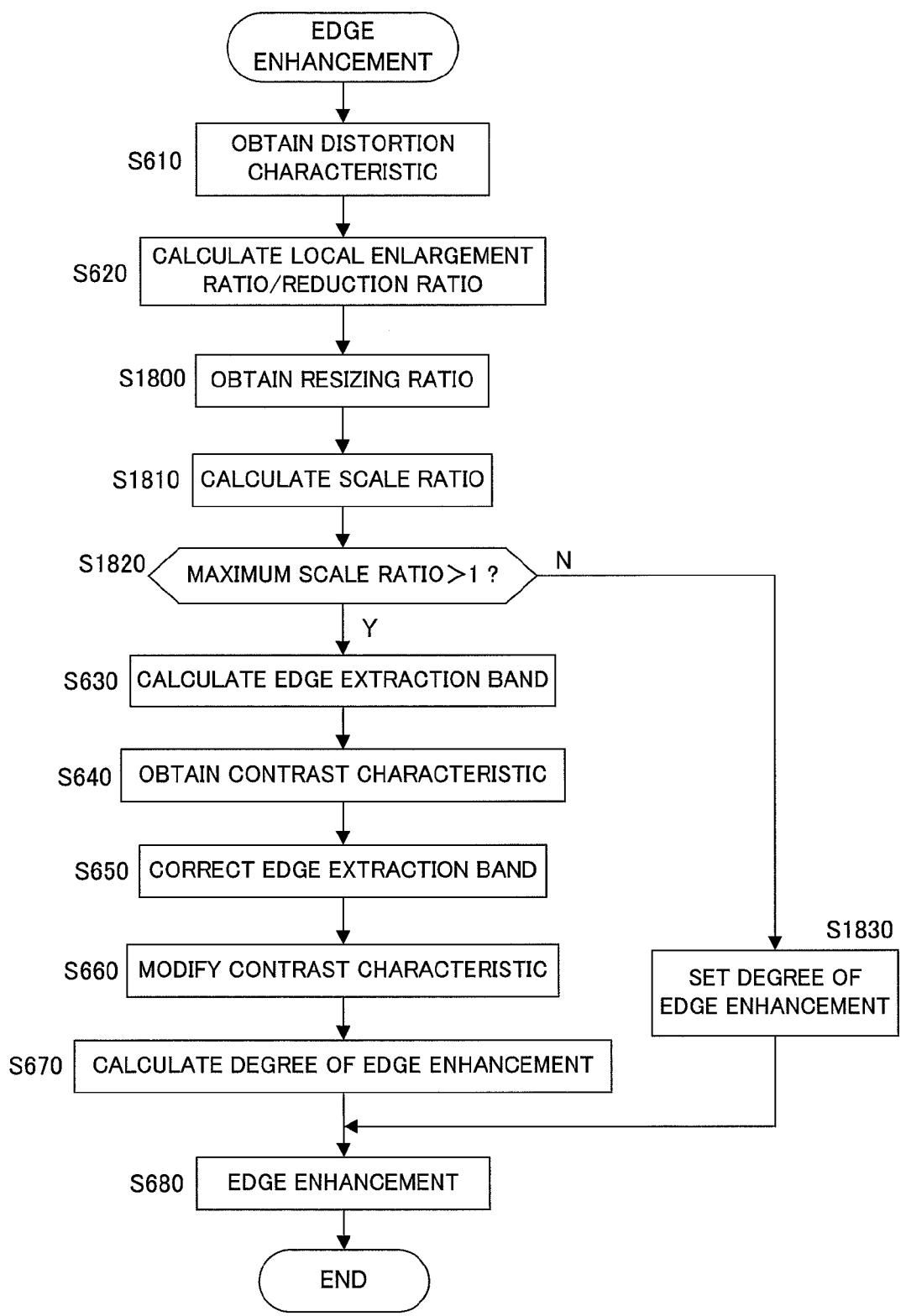
FIG. 18 is a flowchart showing in detail the edge enhancement processing according to a third embodiment.

FIG. 18 is a flowchart showing in detail the processing of the step S560 of the flowchart shown in FIG. 5, or in other words the edge enhancement processing. Steps in which identical processing to the processing of the flowchart shown in FIG. 6 is performed have been allocated identical numbers and detailed description thereof has been omitted.

In a step S1800 following the step S620, a resizing ratio to be used during the resizing processing is obtained. The resizing processing is processing for reducing or enlarging the image size in order to record or display the image data (step S590 in FIG. 5).

In a step S1810, a scale ratio is calculated for each pixel of the image data by multiplying the resizing ratio obtained in the step S1800 by the enlargement ratio or reduction ratio calculated in the step S620.

In a step S1820, a determination is made as to whether or not a maximum scale ratio, from among the scale ratios calculated for the respective pixels in the step S1810, is greater than 1. When the maximum scale ratio is greater than 1, local enlargement processing is performed on the image, leading to a reduction in the contrast of the location where the enlargement processing is performed. Hence, when the maximum scale ratio is determined to be larger than 1, the routine advances to the step S630 to perform edge enhancement control. The processing from the step S630 to the step S680 is identical to the processing of the flowchart shown in FIG. 6.

When the maximum scale ratio is equal to or smaller than 1, on the other hand, no enlargement processing is performed on the entire image, and therefore a local reduction in contrast does not occur. Hence, when the maximum scale ratio is determined to be equal to or smaller than 1 in the step S1820, the routine advances to a step S1830, in which a predetermined degree of edge enhancement is set. The predetermined degree of enhancement is determined in advance by design at an identical value for each pixel.

In the image processing apparatus according to the third embodiment described above, when a maximum value of the product of the local enlargement ratio or reduction ratio used to perform distortion correction processing and the resizing ratio used to enlarge or reduce the image data to an ultimately required image size is equal to or smaller than a predetermined threshold, processing for modifying the edge enhancement processing is not performed. Hence, when a local reduction in contrast does not occur, processing for modifying the edge enhancement processing is not performed, and therefore a processing load can be lightened and a processing time can be shortened.

Fourth Embodiment

The constitution of a digital still camera to which an image processing apparatus according to a fourth embodiment is applied is identical to the constitution of the digital still camera to which the image processing apparatus according to the first embodiment shown in FIG. 1 is applied.

Figure 19:
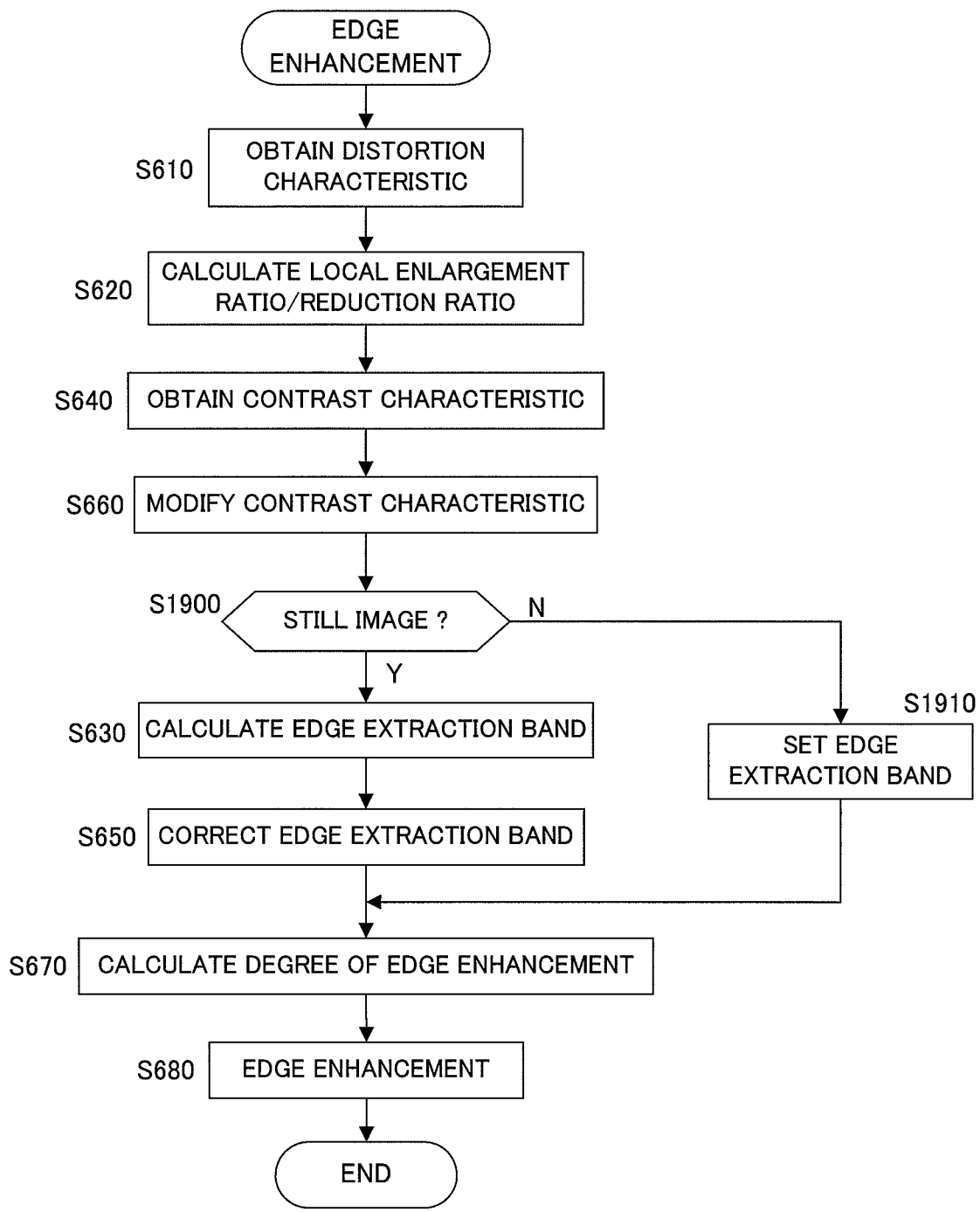
FIG. 19 is a flowchart showing in detail the edge enhancement processing according to a fourth embodiment.

FIG. 19 is a flowchart showing in detail the processing of the step S560 of the flowchart shown in FIG. 5, or in other words the edge enhancement processing. Steps in which identical processing to the processing of the flowchart shown in FIG. 6 is performed have been allocated identical numbers and detailed description thereof has been omitted.

In the step S620, the enlargement ratio or reduction ratio to be used during local enlargement/reduction processing is calculated for each pixel of the image data, whereupon the routine advances to the step S640. In the step S640, the contrast characteristic corresponding to the frequency of the captured image is calculated.

In the step S660, a contrast characteristic following distortion correction is determined for each pixel of the image data in accordance with the enlargement ratio or reduction ratio calculated in the step S620.

In a step S1900, a determination is made as to whether the processing subject image data are still image data or moving image data. This determination can be made on the basis of whether a still image pickup operation or a moving image pickup operation has been performed. When the user views a moving image, he/she is not so concerned about the fine resolution of the image. Therefore, when the processing subject image data are determined to be moving image data, the routine advances to a step S1910, in which simple edge enhancement processing taking distortion correction into account is performed.

In the step S1910, a predetermined edge extraction band is set. The predetermined edge extraction band is determined in advance by design at an identical value for each pixel.

When the processing subject image data are determined to be still image data in the step S1900, on the other hand, the routine advances to the step S630. The processing of the steps S630, S650, S670 and S680 is performed identically to the processing of the flowchart shown in FIG. 6.

In the flowchart shown in FIG. 19, the degree of edge enhancement is calculated at a value taking distortion correction into account during moving image data processing, whereas a fixed value not taking distortion correction into account is used with regard to the edge extraction band. However, a value that takes distortion correction into account may be calculated with regard to the edge extraction band while a fixed value not taking distortion correction into account is used as the degree of edge enhancement.

In the image processing apparatus according to the fourth embodiment described above, during still image pickup, processing is performed to modify the frequency band in which the edge enhancement processing is to be performed and the degree of edge enhancement taking into account the distortion correction processing, whereas during moving image pickup, only one of the processing to modify the frequency band in which the edge enhancement processing is to be performed and the processing to modify the degree of edge enhancement is performed. As a result, a processing speed of the moving image data processing, in which the fine resolution is not of great visual concern, can be improved. Further, during still image data processing, the processing to modify the frequency band in which the edge enhancement processing is to be performed and the processing to modify the degree of edge enhancement are both performed taking distortion correction into account, and therefore an image having a contrast that is close to being uniform can be generated.

In the above description of the first to fourth embodiments, it is assumed that the processing performed by the image processing apparatus is hardware processing, but this invention need not be limited to such a constitution. For example, a constitution in which the processing is performed by software may be employed. In this case, the image processing apparatus includes a CPU, a main storage device such as a RAM, and a computer-readable storage medium storing a program for realizing all or a part of the processing described above. Here, the program is referred to as an image processing program. By having the CPU read the image processing program stored on the storage medium and execute information processing/calculation processing, similar processing to that of the image processing apparatus described above is realized.

Here, a computer-readable storage medium denotes a magnetic disk, a magneto-optical disk, a CD-ROM, a DVD-ROM, a semiconductor memory, and so on. Further, the image processing program may be distributed to a computer by a communication line, whereupon the computer executes the received distributed image processing program.

This invention is not limited to the first to fourth embodiments described above and may be subjected to various modifications and applications within a scope that does not depart from the spirit of the invention. For example, a case in which the image processing apparatus is applied to a digital still camera was cited as an example, but the image processing apparatus may be applied to a video camera, an electronic device other than a camera, and so on.

In each of the embodiments described above, the frequency band in which edge enhancement processing is to be implemented and the degree of edge enhancement are determined taking into account the contrast characteristic, which is calculated on the basis of the MTF characteristic of the interchangeable lens 2. However, the frequency band and degree of edge enhancement may be determined using a simpler method. For example, data defining the relationship of the enlargement ratio or reduction ratio corresponding to the distortion characteristic of the interchangeable lens 2 to the edge extraction band and degree of edge enhancement may be stored in the Flash memory 1011 in advance, and the edge extraction band and degree of edge enhancement may be determined on the basis of these data.

The digital still camera is described as being constituted by the camera main body 1 and the interchangeable lens 2, but the camera main body and the lens may be formed integrally. In this case, data relating to the distortion characteristic corresponding to the focal length and focus position of the lens and data relating to the MTF characteristic of the lens may be stored in a memory provided in the interior of the camera main body.

This application claims priority based on JP2009-242185, filed with the Japan Patent Office on Oct. 21, 2009, the entire contents of which are incorporated into this specification by reference.

What is claimed is:

1. An image processing apparatus comprising:
an edge enhancement unit that implements edge enhancement processing on an input image data;
a distortion correction unit that implements distortion correction processing on the image data subjected to the edge enhancement processing to correct a distortion by executing local enlargement processing or reduction processing corresponding to an optical distortion characteristic of a lens employed during an image pickup operation; and
a control unit that modifies the edge enhancement processing performed on the image data to be subjected to the distortion correction processing in accordance with the local enlargement processing or reduction processing,
wherein the control unit does not perform processing to modify the edge enhancement processing when a maximum value of a product of a local enlargement ratio or reduction ratio used in the local enlargement processing or reduction processing and a resizing ratio used to enlarge or reduce the image data to an ultimately required image size is equal to or smaller than a predetermined threshold.

2. An image processing apparatus comprising:
a distortion correction unit that implements distortion correction processing on an input image data to correct a distortion by executing local enlargement processing or reduction processing corresponding to an optical distortion characteristic of a lens employed during an image pickup operation;
an edge enhancement unit that implements edge enhancement processing on the image data subjected to the distortion correction processing; and
a control unit that modifies the edge enhancement processing performed on the image data subjected to the distortion correction processing in accordance with the local enlargement processing or reduction processing,
wherein the control unit does not perform processing to modify the edge enhancement processing when a maximum value of a product of a local enlargement ratio or reduction ratio used in the local enlargement processing or reduction processing and a resizing ratio used to enlarge or reduce the image data to an ultimately required image size is equal to or smaller than a predetermined threshold.

3. An image processing apparatus comprising:
an edge enhancement unit that implements edge enhancement processing on an input image data;
a distortion correction unit that implements distortion correction processing on the image data subjected to the edge enhancement processing to correct a distortion by executing local enlargement processing or reduction processing corresponding to an optical distortion characteristic of a lens employed during an image pickup operation; and
a control unit that modifies the edge enhancement processing performed on the image data to be subjected to the distortion correction processing in accordance with the local enlargement processing or reduction processing,
wherein the control unit modifies a frequency band in which the edge enhancement processing is implemented in accordance with the local enlargement processing or reduction processing,
wherein the control unit modifies the frequency band in which the edge enhancement processing is implemented and a degree of edge enhancement, which indicates a degree by which an edge is enhanced, in accordance with the local enlargement processing or reduction processing,
wherein the control unit increases the degree of edge enhancement in relation to a location in which the enlargement processing is executed by the distortion correction unit,
wherein the control unit reduces the degree of edge enhancement in relation to a location in which the reduction processing is executed by the distortion correction unit, and
wherein the control unit does not perform processing to modify the edge enhancement processing when a maximum value of a product of a local enlargement ratio or reduction ratio used in the local enlargement processing or reduction processing and a resizing ratio used to enlarge or reduce the image data to an ultimately required image size is equal to or smaller than a predetermined threshold.

4. An image processing apparatus comprising:
a distortion correction unit that implements distortion correction processing on an input image data to correct a distortion by executing local enlargement processing or reduction processing corresponding to an optical distortion characteristic of a lens employed during an image pickup operation;

an edge enhancement unit that implements edge enhancement processing on the image data subjected to the distortion correction processing; and a control unit that modifies the edge enhancement processing performed on the image data subjected to the distortion correction processing in accordance with the local enlargement processing or reduction processing, wherein the control unit modifies a frequency band in which the edge enhancement processing is implemented in accordance with the local enlargement processing or reduction processing, wherein the control unit modifies the frequency band in which the edge enhancement processing is implemented and a degree of edge enhancement, which indicates a degree by which an edge is enhanced, in accordance with the local enlargement processing or reduction processing, wherein the control unit increases the degree of edge enhancement in relation to a location in which the enlargement processing is executed by the distortion correction unit, wherein the control unit reduces the degree of edge enhancement in relation to a location in which the reduction processing is executed by the distortion correction unit, and wherein the control unit does not perform processing to modify the edge enhancement processing when a maximum value of a product of a local enlargement ratio or reduction ratio used in the local enlargement processing or reduction processing and a resizing ratio used to enlarge or reduce the image data to an ultimately required image size is equal to or smaller than a predetermined threshold.

5. The image processing apparatus as defined in claim 1, wherein the predetermined threshold is 1.0.

6. The image processing apparatus as defined in claim 2, wherein the predetermined threshold is 1.0.

7. The image processing apparatus as defined in claim 3, wherein the predetermined threshold is 1.0.

8. The image processing apparatus as defined in claim 4, wherein the predetermined threshold is 1.0.

9. An imaging apparatus comprising:

an image processing apparatus including an edge enhancement unit that implements edge enhancement processing on an input image data, a distortion correction unit that implements distortion correction processing on the image data subjected to the edge enhancement processing to correct a distortion by executing local enlargement processing or reduction processing corresponding to an optical distortion characteristic of a lens employed during an image pickup operation, and a control unit that modifies the edge enhancement processing performed on the image data to be subjected to the distortion correction processing in accordance with the local enlargement processing or reduction processing; and a storage unit that stores a contrast characteristic corresponding to a frequency of an imaging lens, wherein the control unit modifies the frequency band in which the edge enhancement processing is implemented in accordance with the contrast characteristic stored in the storage unit, wherein the control unit performs processing to modify the frequency band in which the edge enhancement processing is implemented and processing to modify the degree of edge enhancement indicating the degree by which an edge is enhanced during a still image pickup operation, and performs one of the processing to modify the frequency band in which the edge enhancement processing is implemented and the processing to modify the degree of edge enhancement during a moving image pickup operation.

10. An imaging apparatus comprising:

an image processing apparatus including an edge enhancement unit that implements edge enhancement processing on an input image data, a distortion correction unit that implements distortion correction processing on the image data subjected to the edge enhancement processing to correct a distortion by executing local enlargement processing or reduction processing corresponding to an optical distortion characteristic of a lens employed during an image pickup operation, and a control unit that modifies the edge enhancement processing performed on the image data to be subjected to the distortion correction processing in accordance with the local enlargement processing or reduction processing; and a storage unit that stores a contrast characteristic corresponding to a frequency of an imaging lens, wherein the control unit modifies the frequency band in which the edge enhancement processing is implemented in accordance with the contrast characteristic stored in the storage unit, wherein the control unit modifies the frequency band in which the edge enhancement processing is implemented and the degree of edge enhancement indicating the degree by which an edge is enhanced in accordance with the contrast characteristic stored in the storage unit, and wherein the control unit performs processing to modify the frequency band in which the edge enhancement processing is implemented and processing to modify the degree of edge enhancement indicating the degree by which an edge is enhanced during a still image pickup operation, and performs one of the processing to modify the frequency band in which the edge enhancement processing is implemented and the processing to modify the degree of edge enhancement during a moving image pickup operation.

11. An image processing method comprising:

a step of implementing edge enhancement processing on an image data;

a step of implementing distortion correction processing on the image data subjected to the edge enhancement processing to correct a distortion by executing local enlargement processing or reduction processing corresponding to an optical distortion characteristic of a lens employed during an image pickup operation; and a step of modifying the edge enhancement processing performed on the image data to be subjected to the distortion correction processing in accordance with the local enlargement processing or reduction processing, wherein the edge enhancement processing is not performed when a maximum value of a product of a local enlargement ratio or reduction ratio used in the local enlargement processing or reduction processing and a resizing ratio used to enlarge or reduce the image data to an ultimately required image size is equal to or smaller than a predetermined threshold.

12. An image processing method comprising:

a step of implementing distortion correction processing on an image data to correct a distortion by executing local enlargement processing or reduction processing corresponding to an optical distortion characteristic of a lens employed during an image pickup operation;

a step of implementing edge enhancement processing on the image data subjected to the distortion correction processing; and a step of modifying the edge enhancement processing performed on the image data subjected to the distortion correction processing in accordance with the local enlargement processing or reduction processing, wherein processing to modify the edge enhancement processing is not performed when a maximum value of a product of a local enlargement ratio or reduction ratio used in the local enlargement processing or reduction processing and a resizing ratio used to enlarge or reduce the image data to an ultimately required image size is equal to or smaller than a predetermined threshold.

* * * * *